(12) United States Patent
Choudhary et al.

(10) Patent No.: US 11,557,195 B2
(45) Date of Patent: Jan. 17, 2023

(54) ALARM MANAGEMENT SYSTEM WITH BLOCKCHAIN TECHNOLOGY

(71) Applicant: CARRIER CORPORATION, Palm Beach Gardens, FL (US)

(72) Inventors: Shantanu Choudhary, Telangana (IN); Balaji Kaliappan, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/252,338

(22) PCT Filed: Dec. 16, 2019

(86) PCT No.: PCT/US2019/066459
§ 371 (c)(1),
(2) Date: Dec. 15, 2020

(87) PCT Pub. No.: WO2020/124067
PCT Pub. Date: Jun. 18, 2020

(65) Prior Publication Data
US 2021/0295674 A1 Sep. 23, 2021

(30) Foreign Application Priority Data
Dec. 14, 2018 (IN) .............................. 201811047480

(51) Int. Cl.
*G08B 29/00* (2006.01)
*G08B 25/00* (2006.01)
(Continued)

(52) U.S. Cl.
CPC ......... *G08B 25/007* (2013.01); *G08B 25/003* (2013.01); *G16Y 10/50* (2020.01);
(Continued)

(58) Field of Classification Search
CPC .... G08B 25/007; G08B 25/003; G16Y 10/50; G16Y 10/80; G16Y 20/10; G16Y 20/20;
(Continued)

(56) References Cited

U.S. PATENT DOCUMENTS 9,345,058 B2   5/2016  Erickson et al.
10,929,931 B1* 2/2021  Bryant ................ H04L 67/1061
(Continued)

FOREIGN PATENT DOCUMENTS

CN   203941592 U   11/2014
CN   204066320 U   12/2014
(Continued)

OTHER PUBLICATIONS

Berger, C. et al. "On Using Blockchains for Safety-Critical Systems", Computer Science, IEEE/ACM 4th International Workshop on Software Engineering for Smart Cyber-Physical Systems (SEsCPS), Sep. 24, 2018, Retrieved from <https://deepai.org/publication/on-using-blockchains-for-safety-critical-systems>, 7 Pages.
(Continued)

*Primary Examiner* — Anh V La
(74) *Attorney, Agent, or Firm* — Cantor Colburn LLP

(57) ABSTRACT

An alarm management system includes a control arrangement, an alarm device, a blockchain, a blockchain application, and a plurality of nodal access sites. The arrangement includes a processor and a storage medium. The device is configured to output an event signal to the control arrangement. The blockchain is stored in the medium, and includes a plurality of transaction types. Each transaction type includes at least one linked transaction, and the at least one linked transaction is time stamped. The blockchain application is stored in the medium, and is executed by the processor, and is configured to time stamp each one of the transactions. The blockchain is applied by the application to
(Continued)

determine a current associated transaction with any one of the transaction types, and output data associated with the current transaction. The plurality of nodal access sites are configured to receive and output the data associated with the current transaction.

16 Claims, 5 Drawing Sheets

(51) Int. Cl.
   *G16Y 10/50* (2020.01)
   *H04L 9/32* (2006.01)
   *H04L 67/12* (2022.01)
   *G06Q 40/08* (2012.01)
   *H04L 9/00* (2022.01)

(52) U.S. Cl.
   CPC .......... *H04L 9/3242* (2013.01); *H04L 9/3247* (2013.01); *H04L 67/12* (2013.01); *G06Q 40/08* (2013.01); *H04L 9/50* (2022.05)

(58) Field of Classification Search
   CPC ..... G16Y 40/20; H04L 9/3242; H04L 9/3247; H04L 67/12; H04L 2209/38; H04L 9/3239; H04L 63/00; H04L 2209/805; H04L 9/50; G06Q 40/08; H04W 4/70; H04W 4/33
   USPC ................ 340/506, 577, 632, 628, 540, 500
   See application file for complete search history.

(56) References Cited

U.S. PATENT DOCUMENTS

| | | | |
|---|---|---|---|
| 2017/0091397 A1 | 3/2017 | Shah | |
| 2017/0344988 A1 | 11/2017 | Cusden et al. | |
| 2018/0001184 A1 | 1/2018 | Tran et al. | |
| 2018/0089758 A1 | 3/2018 | Stradling et al. | |
| 2018/0218455 A1* | 8/2018 | Kolb | G06Q 30/08 |
| 2018/0219893 A1* | 8/2018 | Li | H04L 63/1425 |
| 2019/0355076 A1* | 11/2019 | Marcinkowski | G06Q 30/0278 |
| 2020/0143300 A1* | 5/2020 | Weldemariam | H04L 9/3239 |
| 2020/0159891 A1* | 5/2020 | Patel | H04L 9/3239 |

FOREIGN PATENT DOCUMENTS

| | | |
|---|---|---|
| CN | 106230931 A | 12/2016 |
| CN | 106652316 A | 5/2017 |
| CN | 107342858 A | 11/2017 |
| CN | 107464118 A | 12/2017 |
| CN | 107507091 A | 12/2017 |
| CN | 107819848 A | 3/2018 |
| WO | 2018143694 A1 | 8/2018 |

OTHER PUBLICATIONS

Beyond Bitcoin: Unique Application of the Blockchain Technology. NewsBTC.com. Published Dec. 10, 2018. Retrieved from <https://plus.google.com/share?url=https://www.newsbtc.com/2015/12/10/beyond-bitcoin-unique-application-of-theblockchain-technology/>, 8 pages.

Distributed Fire-Alarm System. CryptoVarna. Published on May 8, 2018, Retrieved from <https://cryptovarna.com/projects/distributed-fire-alarm-system/>, 18 Pages.

International Search Report for International Application No. PCT/US2019/066459; Date of Completion: Feb. 7, 2020; dated Feb. 17, 2020; 5 Pages.

Let's Talk About Fire Protection 4.0. Vighnaharta Technologies. Published Aug. 22, 2019. Updated Oct. 21, 2020. Retrieved from <https://vighnaharta.in/blogs/lets-talk-about-fire-protection-4-0/>, 3 Pages.

O'Donnell, B. "Blockchain making houses safer", Horizon: The EU Research & Innovation Magazine—European Commission, Aug. 16, 2017, Retrieved from <https://horizon-magazine.eu/article/blockchain-making-houses-safer_en.html>, 3 Pages.

Roman, R. et al. "Trust and Reputation Systems for Wireless Sensor Networks", Department of Computer Science, University of Malaga, 29071, Malaga, Spain, Jan. 2009, Retrieved from <https://www.nics.uma.es/sites/default/files/papers/Roman2009b.pdf>, 25 Pages.

Wireless sensor network. Wikipedia. Revised Dec. 6, 2018. Retrieved on Jul. 2, 2020 from <https://en.wikipedia.org/wiki/Wireless_sensor_network>, 13 Pages.

Written Opinion of the International Searching Authority for International Application No. PCT/US2019/066459; International Filing Date: Dec. 16, 2019; dated Feb. 17, 2020; 9 Pages.

\* cited by examiner

ALARM MANAGEMENT SYSTEM WITH BLOCKCHAIN TECHNOLOGY

CROSS-REFERENCE TO RELATED APPLICATIONS

This application is a Non-Provisional Application of PCT/US2019/066459 filed Dec. 16, 2019, which claims the benefit of Indian Application Serial No. 201811047480 filed Dec. 14, 2018, the disclosure of which is incorporated herein by reference in its entirety.

BACKGROUND

The present disclosure relates to an alarm management system, and more particularly, to an alarm management system utilizing blockchain technology.

Typical fire management systems are configured to store historical information and event(s) data in digital format typically within a computer storage medium of, for example, a local fire panel. These records are often need by regulatory agencies, insurance companies, and maintenance service entities. Often, use of such records requires verification/authentication (i.e., to gain approval compliance) that can be difficult to achieve.

BRIEF DESCRIPTION

An alarm management system according to one, non-limiting, embodiment of the present disclosure includes at least one processor; at least one storage medium; a control arrangement including a processor of the at least one processor and a storage medium of the at least one storage medium; an alarm device configured to output an event signal to the control arrangement; a blockchain stored in the at least one storage medium and including a plurality of linked transaction types, wherein each one of the plurality of linked transaction types include at least one linked transaction, and the at least one linked transaction is time stamped; a blockchain application stored in the at least one storage medium and executed by the at least one processor, wherein the blockchain application is configured to receive the event signal, time stamp the event signal, transform the time stamped event signal into a linked transaction associated with one of the plurality of linked transaction types, and apply the blockchain to determine a current transaction associated with any one of the plurality of transaction types and output data associated with the current transaction; and a plurality of nodal access sites, wherein at least one of the plurality of nodal access sites is configured to receive and output the data associated with the current transaction.

In addition to the foregoing embodiment, the plurality of nodal access sites are configured to communicate with one-another.

In the alternative or additionally thereto, in the foregoing embodiment, the plurality of nodal access sites include at least one of a regulatory compliance site, a service contract and maintenance site, and an insurance site.

In the alternative or additionally thereto, in the foregoing embodiment, the system includes a plurality of fire detection devices each adapted to output at least one event signal to the control arrangement, wherein the alarm device is one of the plurality of fire detection devices.

In the alternative or additionally thereto, in the foregoing embodiment, the system includes a plurality of fire detection devices each adapted to output an event signal to the control arrangement, wherein the alarm device is one of the plurality of fire detection devices.

In the alternative or additionally thereto, in the foregoing embodiment, the plurality of linked transaction types include at least one of an alarm transaction type, an event transaction type, a maintenance transaction type, a telemetry transaction type, a new device addition transaction type, and a device replacement transaction type.

In the alternative or additionally thereto, in the foregoing embodiment, the plurality of linked transaction types include at least one of an alarm transaction type, an event transaction type, a maintenance transaction type, a telemetry transaction type, a new device addition transaction type, and a device replacement transaction type.

In the alternative or additionally thereto, in the foregoing embodiment, the plurality of fire detection devices each include a unique address and the information outputted by anyone of the plurality of fire detection devices includes the respective unique address.

In the alternative or additionally thereto, in the foregoing embodiment, each transaction includes the unique address associated with the respective fire detection device of the plurality of fire detection devices.

A method of operating an alarm management system according to another, non-limiting, embodiment includes sending an alarm device signal from an alarm device to a control arrangement; applying a blockchain application stored at least in a storage medium of the control arrangement and executed by a processor of the control arrangement to associate the alarm device signal with one of a plurality of transaction types; applying a time stamp to the alarm device signal by the blockchain application; recording the alarm device signal and the time stamp as a transaction; and recording the transaction as part of a blockchain stored at least in the storage medium.

In the alternative or additionally thereto, in the foregoing embodiment, the alarm device signal is one of a plurality of alarm device signals each including an address associated with a respective alarm device of a plurality of alarm devices.

In the alternative or additionally thereto, in the foregoing embodiment, the transaction types include an alarm event transaction type, a maintenance transaction type, and a device replacement transaction type.

In the alternative or additionally thereto, in the foregoing embodiment, the method includes reviewing at least a portion of the blockchain by a user of an access site.

In the alternative or additionally thereto, in the foregoing embodiment, the access site is one of a plurality of access sites each in communication with the control arrangement.

In the alternative or additionally thereto, in the foregoing embodiment, the plurality of access sites include at least one of a regulatory compliance site, a service contract and maintenance site, and an insurance agency site.

In the alternative or additionally thereto, in the foregoing embodiment, the method includes applying a previous block hash, transaction identification of a current transaction, validation signature, and token for each transaction from at least one of the alarm device and the control arrangement.

The foregoing features and elements may be combined in various combinations without exclusivity, unless expressly indicated otherwise. These features and elements as well as the operation thereof will become more apparent in light of the following description and the accompanying drawings.

However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
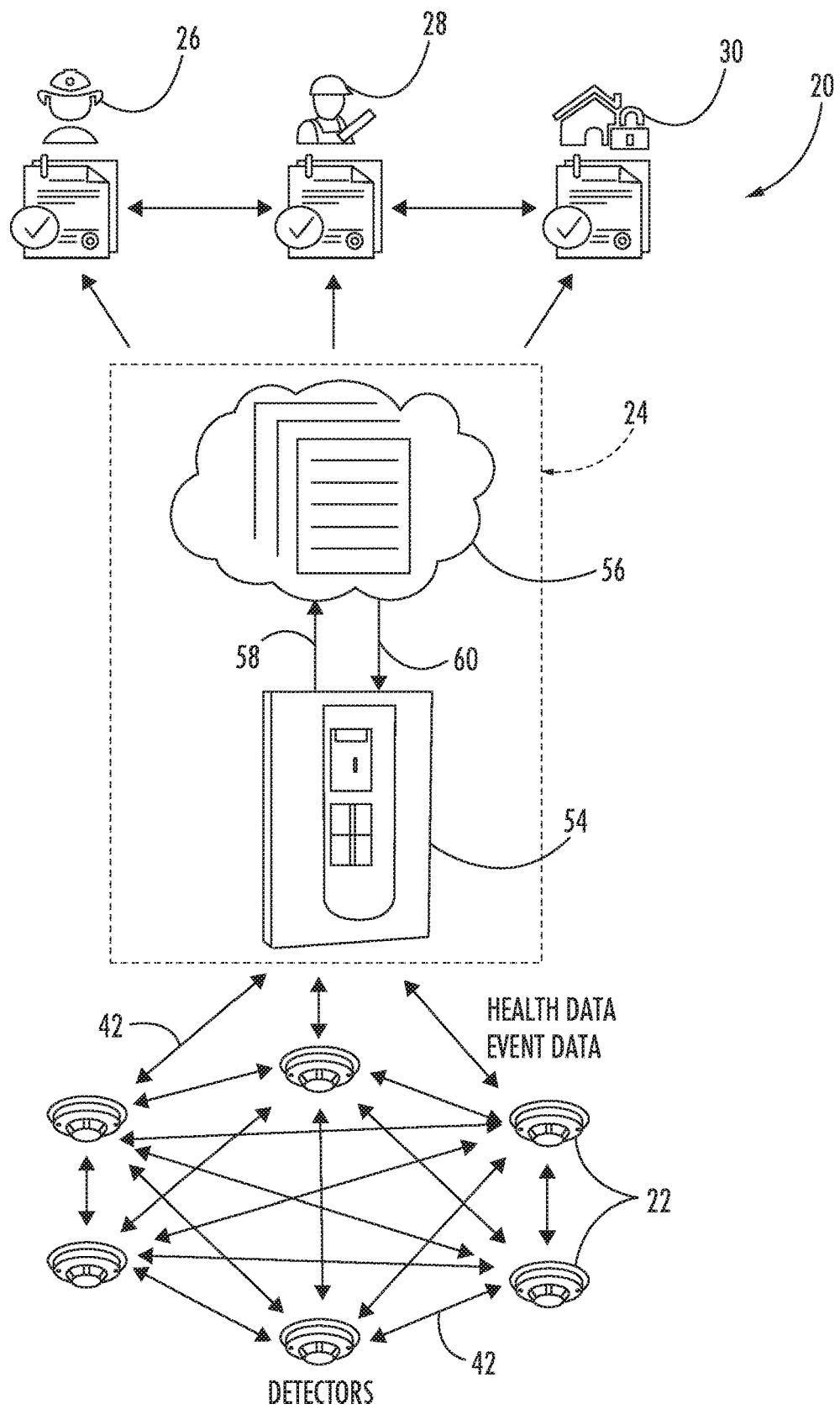
FIG. 1 is a schematic of an alarm management system as one, non-limiting, exemplary embodiment of the present disclosure.

Referring to FIG. 1, an alarm management system 20 of the present disclosure facilitates an ability to create, edit, and maintain secured records and data for regulatory compliance agencies, insurance agencies, and service and maintenance entities. With regard to the regulatory compliance agencies, the system 20 may track editable record of equipment history, maintenance, and system events to be presented to the agency for regulatory approvals. With regard to the insurance agencies, the system 20 may maintain an editable history of events (e.g., alarm events, maintenance, and others) for insurance premium calculations and claim processing. With regard to the service contract and maintenance entities, the system 20 may maintain editable history of maintenance schedules, executions, part replacement, and renewal timelines to be applied by technicians and service providers.

Figure 2:
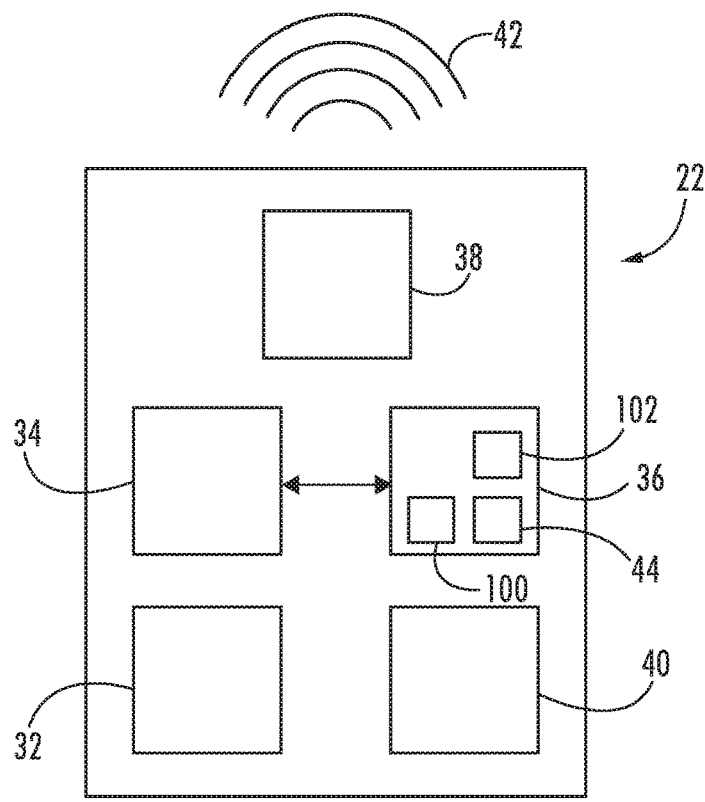
FIG. 2 is a schematic of an alarm device of the system.

The alarm management system 20 may include a plurality of alarm devices 22, a control arrangement 24, and a plurality of nodal access sites (i.e., three illustrated as 26, 28, 30). Referring to FIGS. 1 and 2, the alarm devices 22 may be configured to communicate with one-another (i.e., inter-linked), and communicate with the control arrangement 24. Each alarm device 22 may include one or more sensors 32 (e.g., heat, smoke, toxic gas), a processor 34 (e.g., microprocessor), an electronic storage medium 36 that may be computer writeable and readable (e.g., non-transitory medium), a transceiver 38, and a user interface 40 (i.e., for local detection device testing, reset, and other functions). In operation, each alarm device 22 may communicate signals (see arrow 42) directly to the control arrangement 24, and/or between each other which may then propagate to the control arrangement 34. The signals 42 may include any variety of information including an alarm event, an identifying address 44 stored in the storage medium 36, a service or maintenance event, an operation condition (e.g., battery level) and others. In one example, a technician or user may have the authorization and ability to enter certain types of data into the alarm device 22 via the user interface 40 or through control arrangement 24 over a communication protocol. The processor 34 may then process the information, attach the address 44, and send as the signal 42 (i.e. packet of information).

The signals 42 may be sent over hard wired or wireless pathways (i.e., via the transceiver 38). In one embodiment, the alarm devices 22, and other components, may generally be interconnected (i.e., networked) via various wireless protocols such as Bluetooth, NFC, Wi-Fi, LiFi, 3G and others. The sensors 32 may include one or more of smoke or particulate detectors, temperature or heat detectors, gas detectors (i.e., carbon monoxide), and others.

Figure 3:
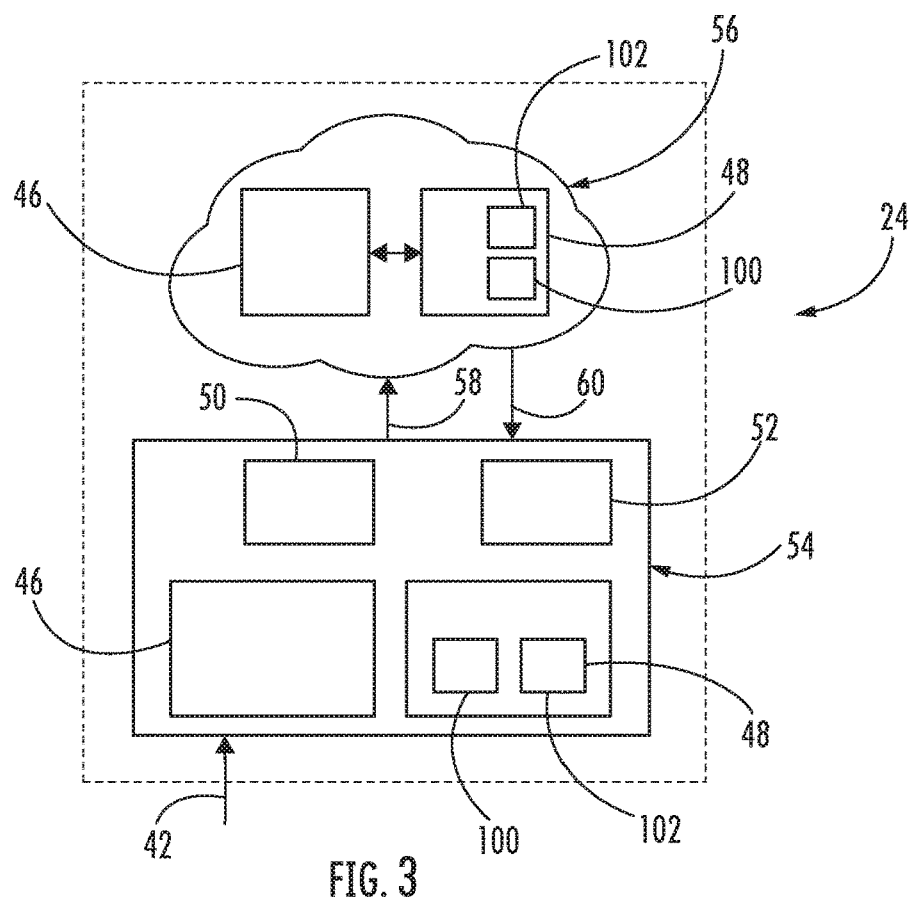
FIG. 3 is a schematic of a control arrangement of the system.

Referring to FIGS. 1 and 3, the control arrangement 24 may include one or more processors 46 (e.g., microprocessor), one or more electronic storage mediums 48 that may be computer writeable and readable (e.g., non-transitory medium), at least one transceiver 50, and at least one user interface 52. In one embodiment, the control arrangement 24 may include a local controller 54 and a remote server 56 (e.g., blockchain server) that may further be cloud or web based. The local controller 54 of the control arrangement 24 may include the processor 46 and the storage medium 48, and is configured to receive the signals 42 from the alarm devices 22 via the transceiver 50, and process the signals 42 via the processor 46. In operation, the local controller 54 may be configured to transmit signals (see arrow 58) and receive signals (see arrow 60) via the transceiver 50, and from the remote server 56. The signals 58, 60 may be sent over hard wired or wireless pathways. In one example, the local controller 54, as a fire panel, may be located in the same facility or building as the alarm devices 22, and may facilitate various notifications, system administrative functions, and management functions. It is further contemplated and understood that the controller 54 may be an integral part of the server 56 (i.e., may share the same processor and computer readable storage medium).

Figure 4:
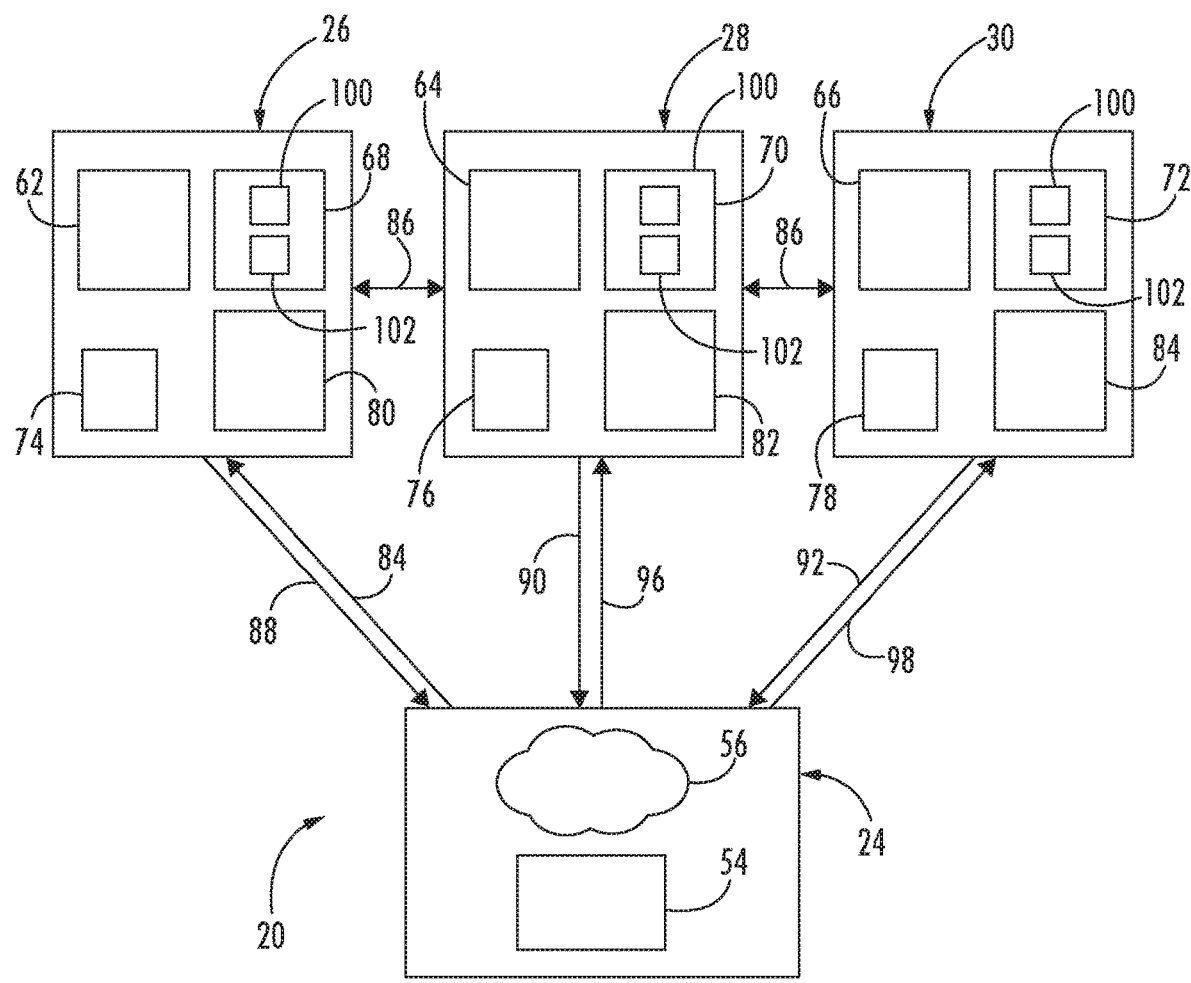
FIG. 4 is a schematic of a plurality of access sites of the system.

Referring to FIGS. 1 and 4, one or more of the nodal access sites 26, 28, 30 may located remotely from the control arrangement 24, remotely from each other, and remotely from the alarm devices 22. The access site 26 may be a regulatory compliance site located, for example, at a government regulatory facility. The access site 28 may be a service contract and maintenance site located, for example, at a service company facility. The access site 30 may be an insurance agency site located, for example, at the business facility of an insurance company agency.

In one embodiment, the nodal access sites 26, 28, 30 may include respective processors 62, 64, 66 (e.g., microprocessor), respective electronic storage mediums 68, 70, 72 that may be computer writeable and readable (e.g., non-transitory medium), respective transceivers 74, 76, 78, and respective user interfaces 80, 82, 84, In operation, the access sites 26, 28, 30 may be configured to send signals (see arrows 86) to each other, send respective signals 88, 90, 92 to the server 56 of the control arrangement 24, and receive respective signals 94, 96, 98 from the server 56.

Referring to FIG. 4, the alarm management system 20 includes, and is supported by, a blockchain application 100 that enhances security and provides historical records (i.e., transactions) with a high degree of confidence. The block chain application makes it less likely, or not possible, to change records in the chain making it a non-editable and trustworthy for any variety of agencies. In one embodiment, the blockchain application 100 may be stored in the storage medium 48 and, at least in-part, executed by the processor 46 of the server 56. By way of example, the term "application" refers to, but is not limited to, a process running on a processor, a processor, an object, an executable, a thread of execution, a program, a software instruction, and/or a computer.

The term "blockchain" refers to, or is associated with, a list of records (i.e., called blocks) capable of growth, and linked using cryptography. Each block 103 (see FIG. 6) of the blockchain 102 may contain a cryptographic hash of the previous block, a timestamp, and transaction data. By design, blockchains 102 (see FIG. 3) are resistant to modification of the transaction data, and is generally an open distributed ledger that can record transactions between parties, and/or entities, efficiently and in a verifiable and permanent way. When applied as a distributed ledger, the blockchain 102 may be managed by a peer-to-peer network collectively adhering to a protocol for inter-node communication and validating new blocks 103. Once recorded, the data in any given block 103 cannot be changed retroactively without a change to all subsequent blocks. Such a change to all subsequent blocks 103 may require a consensus of the network majority. Such a change may also need all the network nodes to be updated with the same data, or information. This arrangement makes it difficult to edit at one node, or otherwise create forged records.

Figure 6:
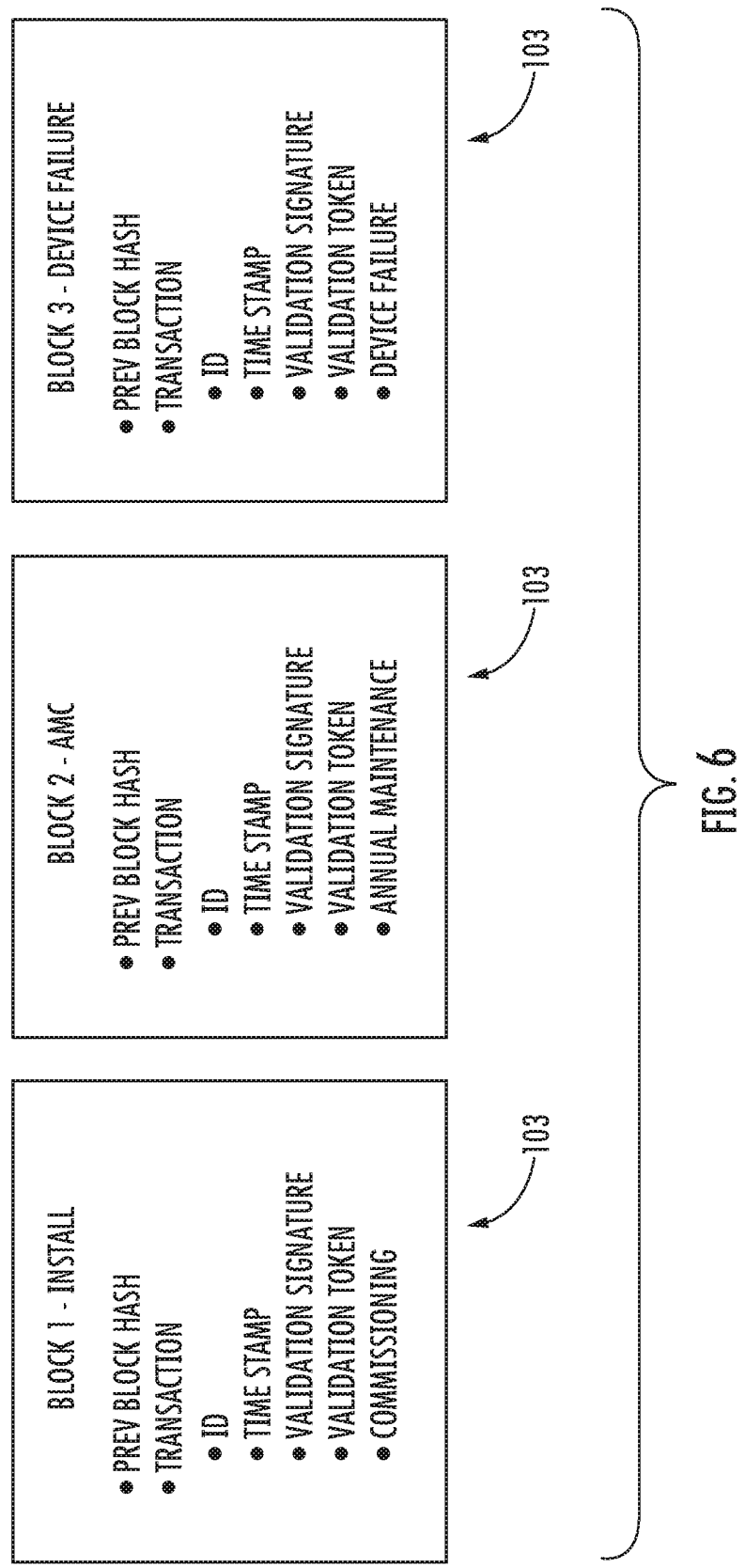
FIG. 6 is a schematic of individual blocks of a blockchain of the system.

As illustrated in FIG. 6, each block 103 may be associated with any one of a variety of transaction types. For example, one transaction type at one block 103 may pertain to an install device transaction, another transaction type at another block may pertain to an AMC transaction, and yet another transaction type at another block may pertain to a device failure transaction.

The storage medium 48 of the server 56 may also store a blockchain 102 (i.e., data file) that is updated, controlled, accessed and/or applied by the blockchain application 100. It is further noted, that in any instance in time, the blockchain 102, or portions thereof, may be accessible and stored in the storage mediums 68, 70, 72 of the respective access sites 26, 28, 30.

Figure 5:
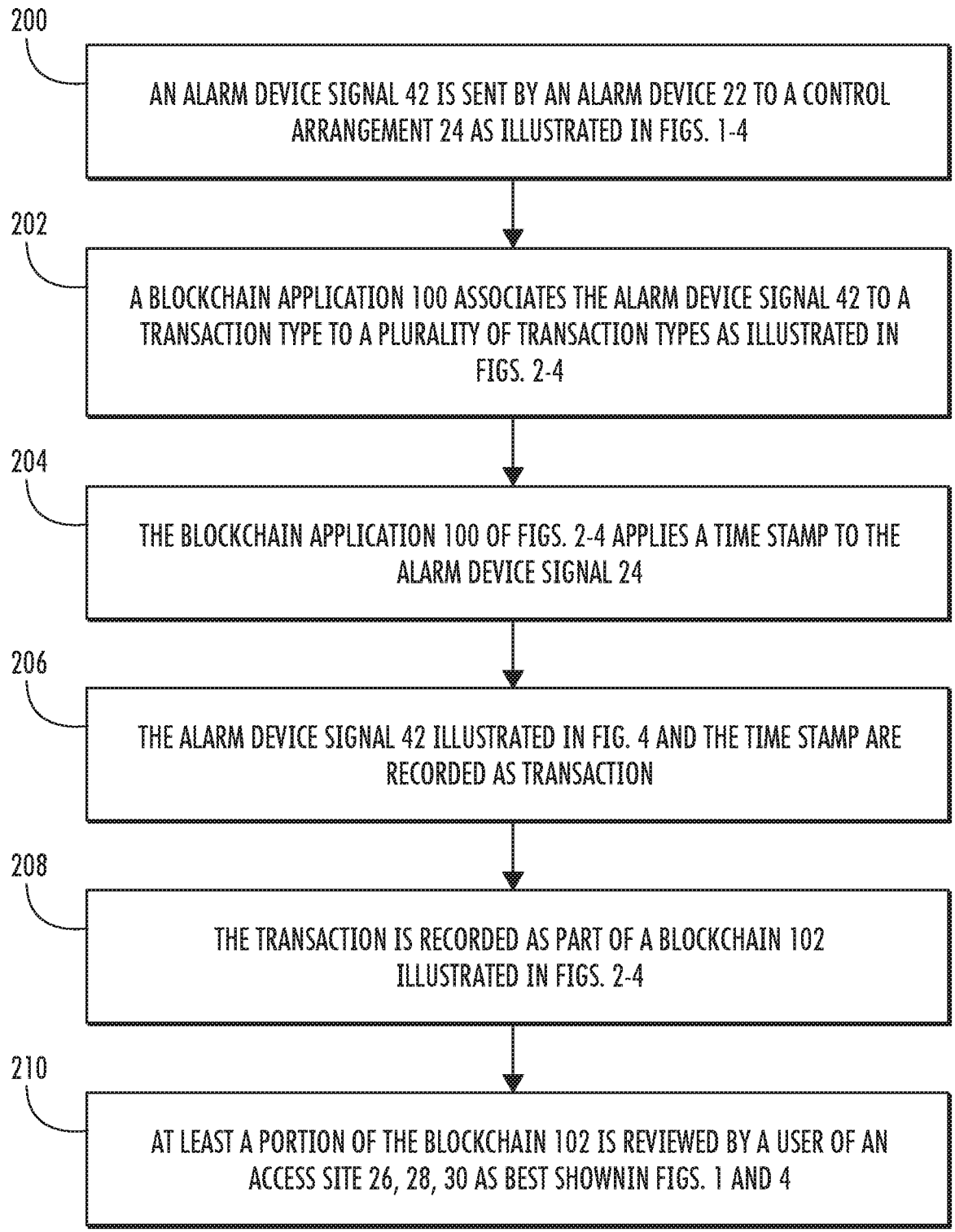
FIG. 5 is a flow chart illustrating a method of operating the system.

Referring to FIG. 5, a flow chart of a method of operating the system 20 of FIG. 1 is illustrated. At block 200, the alarm device signal 42, illustrated in FIGS. 1 and 2, is sent by the alarm device 22 to the control arrangement 24. At block 202, the blockchain application 100, illustrated in FIGS. 2-4, associates the alarm device signal 42 to a transaction type of a plurality of transaction types. At block 204, the blockchain application applies the time stamp to the alarm device signal (see FIG. 6 for non-limiting examples of blocks 103 that include time stamps). At block 206, the alarm device signal and the time stamp are recorded as a transaction. At block 208 the transaction is recorded as part of the blockchain 102 illustrated in FIGS. 2-4. At block 210, at least a portion of the blockchain 102 is reviewed by a user of an access site 26, 28, 30 illustrated in FIG. 1. Non-limiting examples of transaction types include an alarm transaction type, an event transaction type, a maintenance transaction type, a telemetry transaction type, a new device addition transaction type, and a device replacement transaction type.

Referring to FIG. 6 and in another embodiment, the method may further include applying a previous block hash, transaction identification of a current transaction, validation signature, and token for each transaction from at least one of the alarm device 22 and the control arrangement 24.

Advantages and benefits of the present disclosure include a blockchain based distributed ledger for alarm, event, and maintenance management systems that provides a verified time stamped authentication receipts, ensuring customers have a high degree of confidence in the security of the system.

The various functions described above and illustrated in FIGS. 1-4, may be implemented or supported by a computer program that is formed from computer readable program codes, and that is embodied in a computer readable medium. Computer readable program codes may include source codes, object codes, executable codes, and others. Computer readable mediums may be any type of media capable of being accessed by a computer (e.g., microprocessor), and may include non-transitory mediums, Read Only Memory (ROM), Random Access Memory (RAM), a hard disk drive, a compact disc (CD), a digital video disc (DVD), or other forms.

Terms used herein such as component, application, module, system, and the like are intended to refer to a computer-related entity, either hardware, a combination of hardware and software, or software execution. By way of example, an application may be, but is not limited to, a process running on a processor, a processor, an object, an executable, a thread of execution, a program, a software instruction, and/or a computer. It is understood that an application running on a server and the server, may be a component or arrangement. One or more applications may reside within a process and/or thread of execution and an application may be localized on one computer and/or distributed between two or more computers.

While the present disclosure is described with reference to illustrated embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An alarm management system comprising:
    a local controller including a local processor and a local storage medium;
    a remote server including a remote controller and a remote storage medium;
    an alarm device configured to output an event signal to the local controller;
    a blockchain stored in the remote storage medium and including a plurality of linked transaction types, wherein each one of the plurality of linked transaction types include at least one linked transaction, and the at least one linked transaction is time stamped;
    a blockchain application stored in the remote storage medium and executed by the remote processor, wherein the blockchain application is configured to receive the event signal from the local controller, time stamp the event signal, transform the time stamped event signal into a linked transaction associated with one of the plurality of linked transaction types, and apply the blockchain to determine a current transaction associated with any one of the plurality of transaction types and output data associated with the current transaction; and
    a plurality of nodal access sites, wherein at least one of the plurality of nodal access sites is configured to receive and output the data associated with the current transaction.

2. The alarm management system set forth in claim 1, wherein the plurality of nodal access sites are configured to communicate with one-another.

3. The alarm management system set forth in claim 2, wherein the plurality of nodal access sites include at least one of a regulatory compliance site, a service contract and maintenance site, and an insurance site.

4. The alarm management system set forth in claim 1, further comprising:
a plurality of fire detection devices each adapted to output at least one event signal to the local controller, wherein the alarm device is one of the plurality of fire detection devices.

5. The alarm management system set forth in claim 3, further comprising:
a plurality of fire detection devices each adapted to output an event signal to the local controller, wherein the alarm device is one of the plurality of fire detection devices.

6. The alarm management system set forth in claim 1, wherein the plurality of linked transaction types include at least one of an alarm transaction type, an event transaction type, a maintenance transaction type, a telemetry transaction type, a new device addition transaction type, and a device replacement transaction type.

7. The alarm management system set forth in claim 5, wherein the plurality of linked transaction types include at least one of an alarm transaction type, an event transaction type, a maintenance transaction type, a telemetry transaction type, a new device addition transaction type, and a device replacement transaction type.

8. The alarm management system set forth in claim 7, wherein the plurality of fire detection devices each include a unique address and the information outputted by anyone of the plurality of fire detection devices includes the respective unique address.

9. The alarm management system set forth in claim 8, wherein each transaction includes the unique address associated with the respective fire detection device of the plurality of fire detection devices.

10. A method of operating an alarm management system comprising:
sending an alarm device signal from an alarm device to a local controller;
sending a signal indicative of the alarm device signal to a remote server;
applying a blockchain application stored in a storage medium of the remote server and executed by a processor of the remote server to associate the alarm device signal with one of a plurality of transaction types;
applying a time stamp to the alarm device signal by the blockchain application;
recording the alarm device signal and the time stamp as a transaction; and
recording the transaction as part of a blockchain stored at least in the storage medium.

11. The method set forth in claim 10, wherein the alarm device signal is one of a plurality of alarm device signals each including an address associated with a respective alarm device of a plurality of alarm devices.

12. The method set forth in claim 11, wherein the transaction types include an alarm event transaction type, a maintenance transaction type, and a device replacement transaction type.

13. The method set forth in claim 10 further comprising:
reviewing at least a portion of the blockchain by a user of an access site.

14. The method set forth in claim 13, wherein the access site is one of a plurality of access sites each in communication with the remote server.

15. The method set forth in claim 14, wherein the plurality of access sites include at least one of a regulatory compliance site, a service contract and maintenance site, and an insurance agency site.

16. The method set forth in claim 10, further comprising:
applying a previous block hash, transaction identification of a current transaction, validation signature, and token for each transaction from the alarm device.

\* \* \* \* \*